United States Patent Office 3,217,076
Patented Nov. 9, 1965

3,217,076
HF OR HF-BF₃ COMPOSITION TREATMENT OF FIBERS AND FILMS OF POLYSTYRENE AND POLYVINYL ALCOHOL OR POLYVINYL ALCOHOL ESTERS AND ETHERS
Kenneth A. Kun, Philadelphia, Pa., assignor to Rohm & Haas Company, Philadelphia, Pa., a corporation of Delaware
No Drawing. Filed Apr. 30, 1962, Ser. No. 191,294
4 Claims. (Cl. 264—232)

The present invention is concerned with the production of novel cross-linked polymers and filaments and fibers comprising polymeric components oriented longitudinally of the axis of the fibers therein. The invention is particularly concerned with artificial fibers formed of polymerized monovinyl aromatic compounds. More particularly, the invention is concerned with fibers of polymerized monovinyl aromatic compounds stabilized against shrinkage on heating. The invention is also concerned with the production of ion-exchange fibers formed of sulfonated vinyl aromatic compounds which are not subject to excessive swelling or shrinking in aqueous media.

In accordance with the present invention, the cross-linked polymers or fibers formed thereof are produced from linear polymeric material containing a vinyl ester or certain alcoholic hydroxyl groups and aromatic nuclei obtained from the addition polymerization of a monovinyl aromatic compound in a polymerization medium containing a free-radical catalyst and a preformed polymer of certain acyl compounds which either contain hydroxyl groups or introduce hydroxyl groups into the polymer on hydrolysis.

It has already been proposed to spin fibers from a polymeric material comprising a vinyl aromatic compound and alkenyl halides, linear aliphatic polyenes, or certain acyl compounds. Many vinyl aromatic polymers are incompatible or have negligible compatibility with many of the polymers of the alkenyl halide or acyl compounds. When copolymers of these two types of compounds or blended polymers of these two types are spun and then subjected to cross-linking, the extent of cross-linking is frequently quite small and of non-uniform character. When stretched filaments or films containing oriented polymers and obtained by spinning a blend of emulsion polymers of these types are subjected to prolonged or severe cross-linking conditions in an attempt to increase the degree of cross-linking, there is usually produced an excessive loss in orientation and tensile strength. The use of polyenes has similar disadvantages and also the tendency to form discolored products on cross-linking.

The present invention provides a novel process of cross-linking capable of producing an improved cross-linked product characterized by a greater degree of cross-linking in conjunction with greater tensile strength for filaments or films having the general type of chemical constitution discussed hereinbefore. It utilizes for the spinning of films or filaments (generally referred to herein as "filmy products") a polymeric material formed of two components. One component is a polymer of at least one monovinyl aromatic compound and the other is a polymer containing vinyl ester units or hydroxyl groups. The two different components may be present in the form of (1) a simple copolymer containing the two components, (2) a blend of two polymers, each containing one of the essential components, either in the form of homopolymers or copolymers of the respective components, (3) a graft copolymer of monovinyl aromatic component on the other essential component, (4) a "layered" particulate copolymer in which the monovinyl aromatic component forms a sheath around the other component, or (5) any mixture of two or more of the polymer systems of (1) to (4). The filmy product may thus be formed by the spinning of aqueous dispersions or organic solvent solutions of the polymeric material by dry- or wet-spinning methods.

A preferred polymeric material to be spun is prepared as an aqueous emulsion polymer system obtained by polymerizing an aqueous emulsion of monoethylenically unsaturated compounds comprising a vinyl aromatic compound in an aqueous medium containing dispersed therein a water-soluble free-radical initiator and a preferred water-insoluble polymer containing vinyl ester units or hydroxyl groups. Regardless of whether the emulsified aryl monomer "grafts" on the dispersed preformed polymer or merely forms an outer coating without grafting thereon, thereby producing a "layered" polymer, or acts in both ways, at the same time, the aryl component and the other component are so intimately mixed that the formed articles, e.g., filaments, made therefrom can be readily cross-linked to a high degree. Also, the emulsion polymer used as the starting material herein can be spun directly into an aqueous electrolyte coagulating bath so that one can capitalize on the advantages of an aqueous spinning material and low viscosity thereof (requiring only low pressure for extrusion).

Oriented filmy products obtained by stretching the formed structures can be highly stabilized by treatment with HF or mixtures thereof with BF₃ without appreciable disorientation or discoloration.

The vinyl aromatic compound used as one essential component in accordance with the present invention may be any compound of the formula

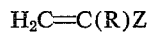

$$H_2C=C(R)Z$$

wherein R is hydrogen or an alkyl group advantageously of less than 3 carbon atoms and Z is an aryl group which has positions on an aromatic nucleus available for substitution. The formula includes vinyl aryls, such as styrene, vinyl naphthalene, vinyl diphenyl, vinyl fluorene, etc., and their nuclear-substituted derivatives, such as alkyl, aryl, alkaryl, aralkyl, cycloalkyl, alkoxy, aryloxy, chloro, fluoro, chloromethyl, fluoromethyl, and trifluoromethyl nuclear derivatives, for example, methyl-styrenes, e.g., o, m, and p-methyl-styrenes, o, m, and p-ethyl-styrenes, isopropyl-styrenes, tolyl-styrenes, benzyl-styrenes, cyclohexyl-styrenes, methoxy-styrenes, phenoxy-styrenes, o, m, and p-chloro-styrenes, o, m, and p-fluorostyrenes, chloromethyl-styrenes, fluoromethyl-styrenes, trifluoromethyl-styrenes, vinyl - methyl-naphthalenes, vinyl - ethyl - naphthalenes, vinyl-chloro-naphthalenes, vinyl-methyl-chloro-naphthalenes, etc. The polymerizable monomers which can be used advantageously with ionic type catalysts include aromatic compounds having a vinyl group containing an alkyl group in its alpha position, e.g., isopropenyl or alpha-methyl-vinyl, alpha-ethyl-vinyl, alpha-propyl-vinyl, etc. Such alpha-alkyl-vinyl groups may be substituted on benzene, naphthalene, diphenyl, fluorene nuclei, etc., and may have other substituents on the aromatic nuclei as illustrated above for the vinyl aryl compounds.

The compounds that may be used for the other essential component of the polymeric material may be a vinyl ester of a saturated monobasic aliphatic acid having 1 to 18 carbon atoms, such as vinyl acetate, vinyl propionate, vinyl butyrate, vinyl laurate, and vinyl stearate. The polymers of the vinyl ester may be partially hydrolyzed to provide hydroxyl groups therein. When the preferred embodiment is carried out, the preformed polymer may be a homopolymer or copolymer of one or more of the vinyl esters mentioned or it may be a partially hydrolyzed polyvinyl ester, the extent of hydrolysis being insufficient to render the preformed polymer water-soluble or so sensitive to water that the dispersed particles agglomerate and thereby interfere with the proper subsequent emulsion polymerization of the vinyl aromatic compound to form a dispersed graft or layered copolymer in latex form. The introduction of 0.5 to 5 mol percent of vinyl alcohol units is quite practical with vinyl acetate, but an even greater extent of hydrolysis is acceptable with a polyvinyl stearate. Instead of a vinyl ester homopolymer or partial hydrolysis product thereof, copolymers of at least 5%, and preferably at least 20%, by weight of a vinyl ester may be used as the preformed polymer.

Examples of comonomers that may be used either with the monovinylaromatic compound or with the vinyl ester in making the two essential components of the polymeric material, including the preformed polymers for use in the preferred embodiment, include esters of acrylic acid or methacrylic acid, including methyl acrylate, ethyl acrylate, 2-hydroxyethyl acrylate, acrylonitrile, vinyl ethers such as hydroxy-$(C_2-C_{10})$-alkyl vinyl ethers and simple ($C_1$ to $C_{18}$)-alkyl vinyl ethers, acrylic acid, methacrylic acid acrylamide, methacrylamide, ethylene, isobutylene, vinyl chloride, and vinylidene chloride. The preformed copolymers to be used in the preferred embodiment may also have their vinyl ester groups hydrolyzed provided the hydrolysis is not so extensive as to make the copolymer agglomerate or become watersoluble. The amount of any water-solubilizing comonomer, such as acrylic acid or acrylamide, is similarly restricted. The preformed polymer may also be a hydroxy-$(C_1-C_{10})$-alkyl vinyl ether or such an ether in which the alkyl group is interrupted by ether oxygen atoms or a copolymer of such hydroxyl-containing vinyl ethers with other comonomers, such as those just mentioned. In any case, the preformed polymers must not be water-soluble or agglomerate so that the content of the hydroxyalkyl vinyl ether may be quite restricted in those cases wherein the alkyl group is only 2 to 3 carbon atoms in size.

It has been discovered that treatment with hydrogen fluoride causes alkylation of aromatic nuclei of the polymer mass by the hydrocarbon of the alcohol or vinyl ester polymer chain or by the alkoxy branches of the polymer chain at the loci of the hydroxyl or vinyl ester groups, thereby effectively cross-linking the product.

Cross-linking may be effected by both alkylation and acrylation if the polymer used in making the formed structure has not only hydroxyl or vinyl ester groups, but also carboxyl groups or groups derivable therefrom such as nitrile or ester groups. The outstanding effectiveness of the vinyl ester or hydroxyl-containing components in cross-linking the products of the present invention especially those using graft or layered polymers makes it possible to obtain highly cross-linked and well stabilized products with a corresponding lower proportion of the alkylating and/or acylating components than heretofore possible of the component other than that of vinyl aromatic type.

When the polymeric material to be spun is a solution in an organic solvent or an aqueous dispersion, of a simple copolymer of the two essential components with or without other comonomers or of a mixture of two homopolymers or copolymers, each containing a separate one of the essential components, the solutions or aqueous dispersions may be prepared by conventional solution or emulsion polymerization processes, separate polymer solutions or aqueous emulsion polymer dispersions being prepared and then mixed or blended in the case of the polymer mixtures.

Preparation of the polymeric material for the preferred embodiment is as follows:

The special preferred polymers to be employed as the starting material for the preparation of cross-linked polymers and structures thereof may be obtained by first polymerizing one or more of the vinyl ester or hydroxylcontaining monomeric compounds defined hereinabove in an aqueous medium containing an emulsifier for the monomer which is also capable of maintaining the polymer produced in dispersed condition.

Examples of emulsifiers include all types such as anionic, non-ionic, and cationic types. When the polymer is to be spun from an aqueous dispersion into an acid coagulating medium, the dispersing agent is preferably of anionic type, though it may include a non-ionic component as well.

The free-radical initiator employed may be any of the water-soluble types such as ammonium persulfate or alkali metal persulfates, hydrogen peroxide, water soluble alkyl hydroperoxides, such as tert-butyl hydroperoxide, and the like. A redox polymerization system may be employed in which the free-radical initiator is used in conjunction with a reducing agent which may also be supplemented with a polyvalent metal ion as a promoter. Examples of reducing agents include alkali metal thiosulfates or hydrosulfites, hydroxylamine, isoascorbic acid, and so on. Examples of polyvalent metal ion promoters include ferric salts, cobaltic or nikelic salts, and so on.

The free-radical initiator may be used in the conventional amounts of 0.2 to 2%, based on the weight of monomers. The amount of reducing agent may be from about 0.1 to 1% based on monomers and the metal ion promoters may be used in trace amounts as is conventional. The temperature during polymerization may be maintained at any point in the range from room temperature up to 110° C., and is preferably in the range of 45° to 70° C.

After polymerization of the vinyl ester or hydroxylcontaining compound to form a homopolymer or copolymer thereof in this fashion, there is added to the polymerization system at least one monovinyl aromatic compound. If necessary, additional emulsifier and additional free-radical initiator may be added and reducing agents and promoters if a redox system is employed.

The polymerization of the vinyl aromatic compound or compounds is then carried out in the presence of the preformed and already dispersed polymer of the vinyl ester or of the hydroxyl-containing compound. When the prepolymer is formed of certain vinyl esters such as vinyl acetate, the polymerization of the vinyl aromatic compound results in a coating of the vinyl aromatic polymer on the polyvinyl ester particles with little or no copolymerization between the vinyl ester and the vinyl aromatic compound so that the resulting product is practically exclusively a layered type of polymer. When the preformed polymer is a copolymer of a vinyl ester with an acrylic ester, the vinyl aromatic is in that case at least partially chemically combined with the preformed copolymer so that, in effect, there is obtained a graft copolymer of the vinyl aromatic on the preformed copolymer.

In either case the vinyl aromatic polymer is disposed in the external portion of the polymeric mass of the dispersed polymer particles in the aqueous polymer dispersion. Whether the resulting dispersion contains polymer particles in which the external portion of the polymeric particle mass is merely layered on the initial preformed polymer particle or is partially grafted by copolymerization and partially layered or is exclusively grafted, it has been found that the resulting polymer particle provides what is, in effect, an extremely intimate association of the vinyl ester or hydroxyl-containing component with the aryl component so that subsequent cross-linking by the use of Lewis acid catalysts is readily capable of producing highly cross-linked and extremely well stabilized products as a result of the alkylation of the aryl nuclei by means of the vinyl ester or hydroxylattached residues of the preformed central portion of the polymeric mass.

The proportion of the vinyl ester or hydroxyl-containing component may be from 1 to 25% by weight of the vinyl aromatic component of the polymeric mass. Preferably, the proportion is from 3 to 18% by weight of the vinyl ester or hydroxyl-containing component based on the weight of the vinyl aromatic component. The proportion of comonomers other than the vinylaromatic and vinyl ester (or hydroxyl-containing) components may be up to 30% by weight of the entire weight of the polymeric mass.

Examples of suitable emulsifiers which produce emulsion polymers adapted to be spun into aqueous media include anionic and non-ionic emulsifiers as disclosed in Bibolet et al. U.S. Patent 2,914,376 (column 6, line 14, to column 7, line 29). The amount of emulsifying agent may vary from a few tenths percent up to about ten percent of the monomers, including both the monomers, such as the vinyl ester or hydroxyl-containing type used to form the prepolymer and the vinyl aromatic type.

Cationic emulsifiers may be employed when the emulsion polymer produced is to be spun into neutral or alkaline baths in the manner disclosed in U.S. Patent 2,869,977. Examples include lauryl pyridinium sulfate, trimethyl(dodecylbenzyl)ammonium chloride.

In general, it has been found that the aqueous polymer dispersions prepared as described can be spun into aqueous coagulating media without the addition of a fusion aid which is normally required when hard polymers such as polystyrene are spun in this manner. It appears that the vinyl ester or the hydroxyl-containing monomer present in the particles of the dispersed polymer serve to assist in the at least partial coalescence of the particles in the coagulated fiber to provide adequate strength for the normal handling of the spun films or filaments in subsequent processing operations.

The subsequent steps in the spinning may be carried out as in the two U.S. patents referred to above. These steps may include a stretching operation for the purpose of orienting the polymers in the extruded structures and thereby increasing the tensile strength thereof. The extruded structure may be stretched by passage about the peripheries of two or more rolls in sequence, the peripheral surfaces of which have increasing speeds in the order of contact with the structure to be stretched. The structure being stretched may be at room temperature, but preferably elevated temperatures such as from 45° to 100° C. are used to facilitate the stretching. The heating step during stretching may also serve to complete the coalescence of the particles in the formed structure. On the other hand, if necessary, a separate heating stage may be provided before or after the stretching step to complete the coalescence of the particles in the structure. This separate heating stage may be carried out at a temperature from about 50° to 150° C.

The extent of stretching generally determines the strength of the final product; usually the greater the stretching, the greater the strength. The stretching may amount to as much as 20 to 1,500% of the initial length of the formed structure before stretching.

The formed, and preferably oriented (i.e., stretched), filmy products obtained from the polymeric masses of linear polymer material containing a portion of vinyl aromatic type and a portion of vinyl ester or hydroxyl-group-containing types is subjected to hydrogen fluoride alone or in admixture with boron trifluoride to effect cross-linking by a reaction which is believed to involve "alkylation" of aromatic nuclei by the polymer residues attached to the hydroxyl or ester groups of the other essential component or portion of the polymeric masses of which the articles are formed. However, it is not intended to be limited to any particular theory of operation.

In accomplishing the stabilization treatment, the hydrogen fluoride may be used in liquid condition at temperatures of about 20° C. or lower. Treatment may vary from a time of 1 to 10 minutes or more. Generally 5 minutes treatment at a temperature of about 18° C. adequately stabilizes the fabric or fibers against shrinkage even on heating up to 180° C. or higher. There is no need to hold the film, fibers or fabric under tension even though the fibers therein are oriented by strecthing. Surprisingly, the treatment can be effected without loss of orientation even without holding the fibers or films under tension. This is quite unusual as the application of other types of agents which cross-link by alkylation generally results in shrinkage unless the fibers or films are held under tension. It has also been surprisingly found that the tensile strength of the films, fibers or fabric is substantially increased by the treatment.

The hydrogen fluoride may be modified by the incorporation of boron trifluoride up to saturation. The use of 0.1 to 5 mol percent or more of boron trifluoride is beneficial to the alkylation treatment and does not require the film or fibers to be held under tension during the treatment. The use of boron trifluoride alone is not effective to cross-link the fiber or film.

Normally it is preferred to use the liquid hydrogen fluoride at temperatures below its boiling point such as about 20° C. or less. However, instead of employing the liquid hydrogen fluoride at normal pressures and under conditions just mentioned, the treatment may be effected in a pressure vessel at pressures up to 1,000 pounds per square inch and at elevated temperatures below the boiling point of the hydrogen fluoride at the pressure used. The use of the pressure allows higher temperatures to be employed such as up to 80° C. or more while still using the reagent in liquid condition. This accelerates the rate of reaction so that a period of less than 1 minute may in some cases be adequate for the purpose of rendering the fibers or fabrics resistant to shrinkage at a temperature of about 90° C. up to 200° C. or higher.

If desired, the hydrogen fluoride may be used in gaseous condition, again with or without a substantial amount of boron trifluoride up to 5 or 10 mol percent of the latter. Treatment with the gaseous material may be effected up to about 80° C. or higher, and the time may vary from half a minute to 5 minutes or more, depending upon the temperature, pressure, and the extent of stabilization desired.

An advantage of the treatment using hydrogen fluoride with or without small amounts of boron trifluoride is the fact that the film, fibers or fabric may be allowed to stand in the reagent medium without being held under tension without suffering a disorientation or loss in strength. In contrast with this, the fibers or film could not be allowed to stand in aluminum chloride alkylating solutions without suffering excessive damage because of disorientation and eventual degradation.

At the completion of the treatment, the films, fibers, or fabrics are removed from the gaseous medium or the hydrogen fluoride is removed by evaporation. This evaporation may be effected by simply exposing the wet fibers or fabrics to normal room temperatures or it may be effected by drying at elevated temperatures such as 140° F. or so. If desired, the film, fibers or filaments may also be washed with an alcohol, such as methanol, to remove any mild discoloration that may be present. While the film, fibers or fabrics still contain an appreciable amount of hydrogen fluoride they should not be treated by water. However, after the hydrogen fluoride has been removed by volatilization, the film, fibers or fabrics may be rinsed with water, alcohols or alkaline solutions including sodium hypochlorite.

The intensity and duration of treatment may be preselected to render the film, fibers or fabrics resistant to shrinkage at any predetermined temperature from about 90° C. (a common scouring temperature) to 200° C. or even higher. Such treatment also renders the film, fibers and fabrics resistant to dry-cleaning solvents. After the treatment which cross-links the molecules in stretched fibers or films, the latter retains at least 75% of its orientation when treated with solvents. In the preferred embodiments, the treatment is sufficiently extensive to render the film or fiber completely insoluble.

Termination of the alkylation treatment may be effected by volatilization of the catalyst solution in a stream of dry air or nitrogen followed by immersion in water, methanol or an alkaline solution. The cross-linking reaction is self-terminating and after the maximum cross-linking obtainable with a given catalyst solution is reached no further changes occur on prolonged standing in the catalyst solution.

The stabilization treatment may be applied to films, pellicles, loose fibers, filamentary bundles such as tows, yarns, plied structures, such as threads, felt-like masses which may be termed non-woven fabrics, as well as fabrics of woven, knitted, netted, knotted, braided, or otherwise formed textile or industrial fabrics. The treating liquid may be applied by spraying thereof upon the fabric or by suitably immersing the fabric or filamentary structure in the liquid. Slashers of textile pads may be employed.

The stabilized films, fibers or fabrics are far more versatile in utility than the uncross-linked polystyrene or related fibers. For example, the fibers and fabrics are adapted to be used in textiles, such as for automobile seat covers, dresses, curtains, and draperies, and are adapted to be subjected to heat, as during ironing and laundering, without undergoing shrinkage. The products not only resist shrinkage under heat, but they are in general stronger and tougher than the films and fibers from which they are made. The fibers can be employed in the making of all sorts of industrial fabrics, felted, woven, or otherwise formed, and are particularly adapted to heavy-duty filtration of all sorts of gases and liquors even at elevated temperatures. The films, fibers and fabrics are also adapted to be converted, as by sulfonation or by haloalkylation and amination into ion-exchange materials adapted to be employed for a wide variety of uses, the pile or tufted type of fabric being particularly useful in this connection. The films thus obtained are of outstanding strength and are highly useful as ion-exchange membranes.

Furthermore, as compared to filmy products made from linear polymeric material comprising a vinyl aromatic component and a linear aliphatic polyene, the steps of cross-linking do not introduce any appreciable discoloration and discoloration is generally quite serious in cross-linking the former products.

If desired, the cross-linked filmy products may be converted into products having ion-exchange properties, e.g., by sulfonation of the aromatic nuclei to introduce cation-exchange sulfonate groups or by chloromethylation thereof followed by reaction with a primary, secondary, or tertiary amine, to form amine or quaternary ammonium groups having anion-exchange capacity. Since, in the preferred embodiments, the aromatic nuclei predominate, to the practical exclusion of the other components of the polymer, in any external surface of the coalesced filmy products formed, these products are adapted to be converted into ion-exchange products having exceptionally high exchange capacities.

In the examples, which are illustrative of the present invention, the parts and percentages are by weight unless otherwise indicated.

Example A is a typical process for preparing an aqueous dispersion of polymers of vinyl aromatic compounds.

EXAMPLE A

A polystyrene dispersion is prepared by combining 300 grams of styrene, 12 grams of the sodium salt of dioctyl sulfosuccinate (75% solids) in 450 grams of water, 1.0 grams of ammonium persulfate in 10 ml. water, 0.9 gram of sodium hydrosulfite in 10 ml. of water, 0.5 gram of tert.-butyl hydroperoxide and 0.02 gram of ferric sulfate in 10 ml. of water were combined in a three-neck round-bottom flask fitted with a stirrer, thermometer and reflux condenser. The components react to yield a polystyrene dispersion, having a pH of 8.2 and a total solids of 37.2%.

Examples B through D following are typical procedures for preparing the preformed polymer of a hydroxyalkyl vinyl ether or of a vinyl ester which can then be used directly (or after partial hydrolysis in an alkaline medium) in the subsequent step of polymerization of the vinyl aromatic monomer to form an aqueous dispersion of a polymeric material for use in the preferred embodiments of the invention.

*Preparation of poly(vinyl ester dispersions)*

EXAMPLE B

PREPARATION OF POLY(VINYL ACETATE) DISPERSIONS (a) Using a three-charge process for convenience, 100 grams of vinyl acetate, 12 grams of the sodium salt of dioctyl sulfosuccinate (75% solids) in 432 grams of water, 0.06 gram of ammonium persulfate in 10 ml. of water, 0.05 gram of sodium hydrosulfite in 10 ml. of water, 0.003 gram of ferric sulfate heptahydrate and 0.1 ml. of tert-butyl peroxide are mixed in a three-neck round-bottom flask fitted with a stirrer, thermometer and a reflux condenser. When the initial exotherm was completed, a second charge of 100 grams of vinyl acetate, 0.06 gram of ammonium persulfate in 10 ml. of water, 0.05 gram of sodium hydrosulfite in 10 ml. of water and 0.1 ml. of tert-butyl peroxide is added to the dispersion in the order of mention. When the initial exotherm is completed, a third charge of the same composition as the second is added in the order mentioned. When the reaction exotherm peaks the dispersion is allowed to cool slowly at room temperature. At 100% conversion, the dispersion should contain 39.2% solids; found 37.6%.

(b) Instead of charging monomer in three distinctive stages, it may be charged continuously or in two or more than three stages. Instead of vinyl acetate, any vinyl ester or a hydroxy-($C_2$-$C_{10}$)-alkyl vinyl ether may be used. Likewise, a mixture of such monomers may be used to form a copolymer. Again the vinyl ester or hydroxy-containing vinyl ether may be copolymerized with another monomer such as with ethyl acrylate, by adding the additional monomer in one or more or all of the monomer charges in part (a).

EXAMPLE C

PREPARATION OF POLY(VINYL STEARATE) DISPERSION (a) One hundred and twenty grams of vinyl stearate, 4 grams of the sodium salt of dioctyl sulfosuccinate (75% solids) in 432 grams of water, 0.02 gram of ammonium persulfate in 10 ml. of water, 0.02 gram of sodium hydrosulfite in 10 ml. of water, 0.0001 gram of ferric sulfate heptahydrate and 0.03 ml. of tert-butyl peroxide are combined in a three-neck round-bottom flask fitted with a stirrer, thermometer and reflux condenser. When the initial exotherm is completed, a second charge of 120 grams of vinyl stearate, 0.02 gram of ammonium persulfate in 10 ml. of water, 0.02 gram of sodium hydrosulfite in 10 ml. of water and 0.03 ml. of tert-butyl peroxide are added to the dispersion in the order mentioned. When the initial exotherm is complete, a third charge of the same composition as the second is added to the dispersion in the order mentioned. When the reaction exotherm peaks, the dispersion is allowed to cool slowly at room temperature. At 100% conversion, the dispersion should contain 41.0% solids; found 38.7%.

(b) The process of part (a) is repeated except that the material added in three-stages contains another monomer such as 50 to 120 grams of ethyl acrylate or acrylamide as well as the 120 grams of vinyl stearate.

*Preparation of polyvinyl ether or sulfide dispersions*

EXAMPLE D (a) PREPARATION OF A DISPERSION OF A VINYL HYDROXYETHYL ETHER POLYMER

To a mixture of 20 grams of hydroxyethyl vinyl ether, 80 grams of tert-butyl acrylate, 12 grams of the sodium salt of dioctyl sulfosuccinate (75% solids) in 432 grams of water, 0.06 gram of ammonium persulfate in 10 ml. of water, 0.05 gram of sodium hydrosulfite in 10 ml. of water, 0.003 gram of ferric sulfate heptahydrate and 0.1 ml. of tert-butyl peroxide are combined in a three-neck round-bottom flask fitted with a stirrer, thermometer and a reflux condenser. When the initial exotherm is completed, a second charge of 100 grams of hydroxyethyl vinyl ether, 0.06 gram of ammonium persulfate in 10 ml. of water, 0.05 gram of sodium hydrosulfite in 10 ml. of water and 0.1 ml. of tert-butyl peroxide are added to the dispersion in the order mentioned. When the initial exotherm is complete, a third charge of the same composition as the second is added to the dispersion in the order mentioned. When the reaction exotherm peaks the dispersion is allowed to cool slowly at room temperature.

(b) PREPARATION OF A POLY(VINYL HYDROXYETHYL SULFIDE) DISPERSION

Part (a) is repeated but the monomers are replaced with 50 grams of hydroxyethyl vinyl sulfide and 50 grams of tert-butyl acrylate.

(c) PREPARATION OF A POLY(VINYL-2-HYDROXYPROPYL ETHER) DISPERSION

Part (a) is repeated using 2-hydroxypropyl vinyl ether instead of hydroxyethyl vinyl ether.

(d) PREPARATION OF A DISPERSION OF A VINYL HYDROXYETHYL ETHER POLYMER

Part (a) is repeated using 30 grams of hydroxyethyl vinyl ether and 70 grams of tert-butyl acrylate.

(e) PREPARATION OF A DISPERSION OF A VINYL HYDROXYETHYL ETHER POLYMER

Part (a) is repeated using 0.5 gram of potassium persulfate in place of the redox catalyst system.

(f) PREPARATION OF A DISPERSION OF A VINYL HYDROXYETHYL SULFIDE POLYMER

Part (b) is repeated using 0.2 gram of potassium persulfate in place of the redox catalyst system.

Example E illustrates the graft or layered polymerization of the vinyl aromatic component on the preferred polymer prepared as illustrated in Examples B through D. Instead of styrene or vinyl toluene (o, m, or p) any of the other vinyl aromatic monomers mentioned hereinabove may be used.

*Preparation of polyvinyl aromatic-poly(vinyl ester) spinning dispersions*

EXAMPLE E (a) To 42.5 grams of poly(vinyl acetate) dispersion, prepared as described in Example B(a), 300 grams of styrene, 12 grams of the sodium salt of dioctyl sulfosuccinate (75% solids) in 450 grams of water, 1.0 grams of ammonium persulfate in 10 ml. of water, 0.9 gram of sodium hydrosulfite in 10 ml. of water, 0.5 gram of tert-butyl hydroperoxide and 0.02 gram of ferric sulfate in 10 ml. of water are mixed in a three-neck round-bottom flask fitted with a stirrer, thermometer and reflux condenser. The components are allowed to react to yield a dispersion having a pH of 2.5 and a total solids of 32.6%.

(b) The procedure of part (a) is followed but increasing the amount of the poly(vinyl acetate) dispersion to 86.7 grams.

(c) The procedure of part (a) is followed but increasing the amount of the poly(vinyl acetate) dispersion to 170 grams.

(d) Part (a) is repeated but using 350 grams of vinyltoluene instead of the styrene.

(e) To 404.0 grams of the poly(vinyl stearate) dispersion of Example C, 300 grams of styrene, 12 grams of the sodium salt of dioctyl sulfosuccinate (75% solids in 450 grams of water, 1.0 gram of ammonium persulfate in 10 ml. of water, 0.9 gram of sodium hydrosulfite in 10 ml. of water, 0.5 gram of tert-butyl hydroperoxide and 0.02 gram of ferric sulfate in 10 ml. of water are combined in a three-neck round-bottom flask fitted with a stirrer, thermometer and reflux condenser. The components are allowed to react to yield a dispersion having pH of 3.2 and a total solids of 31.9%.

(f) The dispersion of Example B(a) is allowed to age until 10% of the acetate groups have been hydrolyzed. The procedure of Example E(e) is repeated substituting the partially hydrolyzed dispersion obtained for the poly(vinyl stearate) dispersion.

(g) Example E(e) is repeated using 80 grams of poly(vinyl hydroxyethyl ether) dispersion instead of poly(vinyl stearate).

(h) Example E(e) is repeated using 80 grams of poly(vinyl hydroxyethyl sulfide) dispersion instead of poly(vinyl stearate).

(i) Example E(e) is repeated using 80 grams of poly(vinyl-2-hydroxypropyl ether) dispersion instead of poly(vinyl stearate).

Example F illustrates the formation of filaments from the polymer dispersions herein described.

EXAMPLE F (a) The dispersion of Example E(a) is extruded through a spinneret formed of a plurality of glass capillary tubes (about 0.01 mm. in external diameter) into an aqueous 30% hydrochloric acid solution also containing 0.5% p-diisobutylphenoxyethoxy-ethyldimethylbenzyl ammonium chloride and is maintained at 85° C. The bundle of filaments formed is drawn through the bath at a rate of about eleven meters per minute. The immersion path is four inches. The yarn is washed on a roll immersed in a trough fed by fresh water and equipped with an overflow pipe. The yarn is then dried by passing it over two canted heated drums revolving at a speed providing a linear peripheral rate of about eleven meters per minute. The temperature of the drum is 230° C. The yarn is then passed over rolls operating at differential speeds to stretch the yarn about 500%. The first of these two rolls is heated to about 120° C. The stretched yarn is collected on a bobbin winder. It has a denier of about 200, a tenacity of 0.9 gram per denier, and an extensibility of 25% at break.

(b) Fibers from the dispersion of Example E(e) are prepared in the same fashion as described in part (a) hereof.

(c) Part (a) is repeated using the dispersion of Example E(f).

(d) Part (a) is repeated using the dispersion of Example E(g).

(e) Part (a) is repeated using the dispersion of Example E(h).

(f) Part (a) is repeated using the dispersion of Example E(i).

(g) Part (a) is repeated using a dispersion containing a blend of poly(vinyl acetate) and polystyrene prepared as follows:

A poly(vinyl acetate) dispersion prepared as described in Example B(a) is adjusted to a pH of 8 by addition of ammonium hydroxide and to 32% solids. A blend is prepared by mixing 62.6 grams of the 32% poly(vinyl acetate) dispersion and 48.6 grams of the 37% polystyrene dispersion obtained as in Example A. The filaments obtained contain 10% poly(vinyl acetate) and 90% polystyrene.

(h) Part (a) is repeated using a dispersion containing a blend of poly(vinyl acetate) and polystyrene prepared as follows:

Mix 125 grams of the 32% poly(vinyl acetate) dispersion having a pH of 8 used in part (g) and 433 grams of the 37% polystyrene dispersion of Example A. The filaments obtained contain 20% poly(vinyl acetate) and 80% polystyrene.

(i) Fibers from the dispersion of Example E(d) are prepared in the same fashion as described in part (a) hereof.

EXAMPLE G (a) A solution of polystyrene in benzene is prepared by adding 90 grams of freshly distilled styrene to 400 ml. of benzene and 0.9 gram of $\alpha,\alpha'$-azoisobutyronitrile. The mixture is heated to reflux under nitrogen with continuous stirring. Stirring and reflux are continued for 24 hours to yield a viscous solution.

(b) A solution of poly(vinyl acetate) in benzene is prepared by adding 10 grams of freshly distilled vinyl acetate to 80 ml. of benzene 0.01 gram of $\alpha,\alpha'$-azoisobutyronitrile. The mixture is heated to reflux under nitrogen with continuous stirring. Stirring and refluxing are continued for 6 hours to yield a viscous solution.

The solutions of parts (a) and (b) hereof are mixed together and then dry spun into an atmosphere of nitrogen at 120–130° C. to yield filaments containing approximately 10% poly(vinyl acetate) and 90% polystyrene.

EXAMPLE 1

(a) A skein of the product of Example F(a) is immersed in hydrogen fluoride at 15° C. for 10 minutes in a reaction vessel formed of polyethylene. The treated skein is removed from the liquid and subjected to a stream of warm dry air at about 30° C. to volatilize the residual hydrogen fluoride. It is then rinsed in water and dried by exposure to the ambient atmosphere. The resulting yarn is insoluble in organic solvents so that it is dry-cleanable. It also undergoes less than 4% shrinkage at temperatures up to and including 115° C. so that it can be secured without excessive shrinkage. As a result of the treatment, the tenacity is increased by about 50% and the toughness is increased by about 50%. The product is white and has a tenacity of 1.29 gram per denier.

(b) When a skein of yarn is formed by the procedure of Example F(a) but from an aqueous dispersion of a blend of 90 parts of polystyrene and 10 parts of polybutadiene instead of the dispersion of Example E(a), and the skein is treated as in part (a) hereof, the product is brown.

(c) The products obtained when the skein treated by the process of part (a) is formed of filaments obtained by the procedure of Example F(a) from the polymer dispersions formed by Examples E(b) and E(c) are white and have tenacities of 1.30 and 1.23 grams per denier respectively, whereas brown products are obtained when the skein thus treated is formed of fibers produced from a blend of 80% polystyrene and 20% polybutadiene (1.31 gram/denier) in one case and 85% polystyrene and 15% polybutadiene in the other.

EXAMPLE 2

Similar white, strong products are obtained by immersing the skeins obtained from filaments produced by the process of Example F(a) from the polymer dispersions of Examples E(a), E(b), and E(c) in hydrogen fluoride into which boron trifluoride was forced under a pressure of 5 p.s.i. gage and held for 18 hours at room temperature.

EXAMPLE 3

Similar white, strong products are obtained by immersing the skeins obtained from filaments produced by the process of Example E(a) from the polymer dispersions of Examples E(a), E(b), and E(c) in hydrogen fluoride into which boron trifluoride was forced under a pressure of 8 p.s.i. gage and held for 3 hours at room temperature.

EXAMPLE 4

A skein of continuous filaments obtained from Example F(b) (using the dispersion of Example E(e)) is treated by the process of Example 1(a). The treated product is insoluble in organic solvents and has improved resistance to shrinkage.

EXAMPLE 5

A skein of continuous filaments obtained from Example F(c) (using the dispersion of Example E(f)) is treated by the process of Example 1(a). The treated produce is insoluble in organic solvents and has improved resistance to shrinkage.

EXAMPLE 6

A skein of continuous filaments obtained from Example F(d) (using the dispersion of Example E(g)) is treated by the process of Example 1(a). The treated product is insoluble in organic solvents and has improved resistance to shrinkage.

EXAMPLE 7

A skein of continuous filaments obtained from Example F(e) (using the dispersion of Example E(h)) is treated by the process of Example 1(a). The treated product is insoluble in organic solvents and has improved resistance to shrinkage.

EXAMPLE 8

A skein of continuous filaments obtained from Example F(f) (using the dispersion of Example E(i)) is treated by the process of Example 1(a). The treated product is insoluble in organic solvents and has improved resistance to shrinkage.

EXAMPLE 9

A skein of continuous filaments obtained from Example F(g) and containing a blend of 10% by weight of poly(vinyl acetate) and 90% by weight of polystyrene is immersed in hydrogen fluoride at 20° C. for 7 minutes in a reaction vessel formed of polyethylene. The treated skein is removed from the liquid and subjected to a stream of warm dry air at about 30° C. to volatilize the residual hydrogen fluoride. It is then rinsed in water and dried by exposure to the ambient atmosphere. The resulting yarn is insoluble in organic solvents so that it is dry-cleanable. It also undergoes less than 5% shrinkage at temperatures up to and including 115° C. so that it can be scoured without excessive shrinkage.

EXAMPLE 10

A skein of continuous filaments obtained from Example F(h) and containing a blend of 20% by weight of poly(vinyl acetate) and 80% by weight of polystyrene is immersed in hydrogen fluoride at 20° C. for 7 minutes in a reaction vessel formed of polyethylene. The treated skein is removed from the liquid and subjected to a stream of warm dry air at about 30° C. to volatilize the residual hydrogen fluoride. It is then rinsed in water and dried by exposure to the ambient atmosphere. The resulting yarn is insoluble in organic solvents so that it is dry-cleanable. It also undergoes less than 6% shrinkage at temperatures up to and including 115° C. so that it can be scoured without excessive shrinkage.

EXAMPLE 11

A skein of continuous filaments obtained from Example G and containing a blend of 10% by weight of poly(vinyl acetate) and 90% by weight of polystyrene is immersed in hydrogen fluoride at 20° C. for 7 minutes in a reaction vessel formed of polyethylene. The treated skein is removed from the liquid and subjected to a stream of warm dry air at about 30° C. to volatilize the residual hydrogen fluoride. It is then rinsed water and dried by exposure to the ambient atmosphere. The resulting yarn is insoluble in organic solvents so that it is dry-cleanable. It also undergoes less than 7% shrinkage at temperatures up to and including 115° C. so that it can be scoured without excessive shrinkage.

EXAMPLE 12

A skein of continuous filaments obtained from Example F(f) (using the dispersion of Example E(d)) is treated by the process of Example 1(a). The treated product is insoluble in organic solvents and has improved resistance to shrinkage.

EXAMPLE 13

PREPARATION OF A SULFONIC ACID ION-EXCHANGE FIBER

A loose skein (2.0 g.) of cross-linked fiber obtained in Example 1(a) was placed in a jar, one-half filled with 96% sulfuric acid. A smaller jar was placed inside the first one to weight the fiber and to keep it wet. The jar was capped with a polyethylene lined screw cap. The jar was placed in constant temperature bath at 25° C. for 24 hours to effect sulfonation.

When the reaction was complete, the fiber was quenched in 300 ml. of cool water, washed about five times to remove most of the acid, then soaked for at least two hours in 10% sodium hydroxide. Excess caustic was removed by washing with deionized water.

EXAMPLE 14

(a) PREPARATION OF A CHLOROMETHYLATED POLY-(STYRENE-VINYL ACETATE) FIBER

Solutions of boron trifluoride in chloromethyl ether were prepared by bubbling $BF_3$ through distilled chloromethyl ether while cooling with the aid of an ice bath. The concentration of $BF_3$ was determined by the gain in weight. The solutions used in chloromethylation were then made up by adding distilled chloromethyl ether to the stock solution which was usually in the range of 2:1 molar $CME/BF_3$.

The freshly prepared $CHE/BF_3$ solution made up and diluted to a 16:1 concentration was poured onto 100 g. of cross-linked fiber (obtained in Example 1(a)) in a reaction vessel. At the end of 15 minutes reaction time the fiber was removed, drained thoroughly and immersed in methanol for five minutes, then in 5% HCl for ten minutes and washed with deionized water several times and finally washed again with methanol and blotted dry. After drying in a vacuum oven for two hours at 50° C. and 29–30 inches of vacuum and a dry air purge of 50 cc./min. the sample was weighed. The extent of chloromethylation is indicated by the weight gain which was 36%.

(b) PREPARATION OF AN AMINE ION-EXCHANGE FIBER

An aminating solution was prepared by mixing 100 grams of 25% trimethylamine, 100 grams of ice and 50 grams of deionized water. The fiber was placed in a small bottle, covered with cold aminating solution, and allowed to stand at room temperature for 2 hours. The solution and fiber were then placed in a beaker and heated at the boiling point for one hour. The fiber was removed and soaked 10 minutes each in two successive batches of 5% HCl then washed with deionized water until the washings were neutral. The fiber was then dried and the gain in weight determined to be 12%.

I claim:
1. In the process comprising:
   (A) forming a latex of particles of a linear polymeric material consisting essentially of
      (1) a monovinyl aromatic compound, and
      (2) at least one compound selected from the group consisting of vinyl alcohol, hydroxyalkyl vinyl ethers, and vinyl esters of monoalkanoic acids having 1 to 18 carbon atoms;
   (B) extruding the latex through a shaped orifice into a coagulating bath to coalesce the particles into a shaped product having at least one small dimension; and
   (C) stretching the shaped product so as to orient the product;
the improvement consisting of
   (D) treating the shaped product with an alkylation catalyst selected from the group consisting of hydrogen flouride and mixtures of hydrogen fluoride with boron trifluoride under conditions including temperature and concentration at which aromatic nuclei of the polymeric mass are alkylated by polymerized units of the compound selected from the group consisting of said vinyl alcohol, vinyl ethers and vinyl esters, the treating being carried out for a sufficient time to render the shaped product resistant to solvents, the shaped product being cross-linked solely by the alkylation of said polymerized units.

2. In the process comprising:
   (A) forming a latex of particles of a linear polymeric material consisting essentially of
      (1) a monovinyl aromatic compound, and
      (2) at least one vinyl ester of a monoalkanoic acid having 1 to 18 carbon atoms;
   (B) extruding the latex through a shaped orifice into a coagulating bath to coalesce the particles into a shaped product having at least one small dimension; and
   (C) stretching the shaped product so as to orient the product;
the improvement consisting of
   (D) treating the shaped product with hydrogen fluoride under conditions including temperature and concentration at which aromatic nuclei of the polymeric mass are alkylated by polymerized units of the vinyl ester, and treating being carried out for a sufficient time to render the shaped product resistant to solvents, the shaped product being cross-linked solely by the alkylation of said polymerized units.

3. In the process comprising:
   (A) forming a latex of particles of a linear polymeric material consisting essentially of
      (1) a monovinyl aromatic compound, and
      (2) at least one hydroxyalkyl vinyl ether;
   (B) extruding the latex through a shaped orifice into a coagulating bath to coalesce the particles into a shaped product having at least one small dimension; and
   (C) stretching the shaped product so as to orient the product;
the improvement consisting of
   (D) treating the shaped product with hydrogen fluoride under conditions including temperature and concentration at which aromatic nuclei of the polymeric mass are alkylated by polymerized units of the vinyl ether, the treating being carried out for a sufficient time to render the shaped product resistant to solvents, the shaped product being cross-linked solely by the alkylation of said polymerized units.

4. In the process comprising:
   (A) forming a latex of particles of a linear polymeric material consisting essentially of
      (1) a monovinyl aromatic compound, and
      (2) a vinyl alcohol;
   (B) extruding the latex through a shaped orifice into a coagulating bath to coalesce the particles into a shaped product having at least one small dimension; and
   (C) stretching the shaped product so as to orient the product;
the improvement consisting of
   (D) treating the shaped product with hydrogen fluoride under conditions including temperature and concentration at which aromatic nuclei of the polymeric mass are alkylated by polymerized units of the vinyl alcohol, the treating being carried out for a sufficient time to render the shaped product resistant to solvents, the shaped product being cross-linked solely by the alkylation of said polymerized units.

(References on following page)

References Cited by the Examiner

UNITED STATES PATENTS

| | | | |
|---|---|---|---|
| 2,405,817 | 8/46 | D'Alelio | 260—886 |
| 2,496,989 | 2/50 | Cupery | 260—29.6 |
| 2,612,485 | 9/52 | Baer | 260—29.6 |
| 2,873,240 | 2/59 | Miller. | |
| 2,926,126 | 2/60 | Graham. | |
| 2,986,507 | 5/61 | Steck. | |
| 3,088,791 | 5/63 | Cline et al. | 8—115.5 |
| 3,089,748 | 5/63 | Mogenson et al. | 8—115.5 |
| 3,111,359 | 11/63 | Fang. | |
| 3,111,362 | 11/63 | Fang et al. | |

FOREIGN PATENTS

| | | |
|---|---|---|
| 503,755 | 12/37 | Great Britain. |
| 794,153 | 4/58 | Great Britain. |

NORMAN G. TORCHIN, *Primary Examiner.*